US005480935A

United States Patent [19]
Greff et al.

[11] Patent Number: 5,480,935
[45] Date of Patent: Jan. 2, 1996

[54] CYANOACRYLATE ADHESIVE COMPOSITIONS

[75] Inventors: Richard J. Greff, Yorba Linda, Calif.;
Patrick J. Tighe, Littleton, Colo.;
Michael M. Byram; Leonard V. Barley, both of Colorado Springs, Colo.

[73] Assignee: MedLogic Global Corporation, Colorado Springs, Colo.

[21] Appl. No.: 299,993

[22] Filed: Sep. 1, 1994

[51] Int. Cl.$^6$ .................................................. C08K 5/09
[52] U.S. Cl. .......................... 524/776; 524/295; 524/296; 524/555
[58] Field of Search .................. 524/775, 776, 524/296, 295, 555

[56] References Cited

U.S. PATENT DOCUMENTS

| | | |
|---|---|---|
| 2,784,127 | 3/1987 | Joyner et al. ............................ 526/298 |
| 3,354,128 | 11/1967 | Weiker .................................... 526/298 |
| 3,527,224 | 9/1970 | Rabinowitz et al. . |
| 3,591,676 | 7/1971 | Hawkins et al. . |
| 3,654,239 | 4/1972 | McIntire et al. . |
| 3,667,472 | 6/1972 | Halpern . |
| 3,699,076 | 10/1972 | Thomsen et al. . |
| 3,722,599 | 3/1973 | Robertson et al. . |
| 3,995,641 | 12/1976 | Kronenthal et al. . |
| 4,035,334 | 7/1977 | Davydov et al. . |
| 4,038,345 | 7/1977 | O'Sullivan et al. . |
| 4,444,933 | 4/1984 | Columbus et al. . |
| 4,650,826 | 3/1987 | Waniczek et al. . |
| 4,958,748 | 9/1990 | Otake . |
| 5,133,970 | 7/1992 | Petereit et al. . |

OTHER PUBLICATIONS

Fung, et. al., Use of Butyl-2-Cyanoacrylate in Rabbit Auricular Cartilage, Arch Otolaryngol, 11:459–460 (1985).

*Primary Examiner*—Jeffrey T. Smith
*Attorney, Agent, or Firm*—Burns, Doane, Swecker and Mathis

[57] ABSTRACT

Alkyl cyanoacrylate compositions comprising at least one alkyl cyanoacrylate, a biocompatible plasticizer (preferably dioctyl phthalate), and $SO_2$ as an artionic polymerization inhibitor are provided. These compositions are suitable for topical application to human skin.

9 Claims, No Drawings

CYANOACRYLATE ADHESIVE COMPOSITIONS

BACKGROUND OF THE INVENTION

1. Field of the Invention

This invention is directed to alkyl cyanoacrylate compositions which are specifically formulated for topical application onto intact or broken human skin. The compositions of this invention are further formulated for single or repeated/intermittent use and are resistant to premature polymerization.

2. State of the Art

Cyanoacrylates are well known in the art and can be represented by formula I:

$$CH_2=C(CN)-COR \qquad I$$

wherein R is an alkyl or other suitable substituent. Such cyanoacrylates are disclosed in U.S. Pat. Nos. 3,527,224; 3,591,676; 3,667,472; 3,995,641; 4,035,334; and 4,650,826. Typically, when applied onto living tissue, the R substituent is alkyl of from 2 to 10 carbon atoms and most often is butyl (e.g., n-butyl).

Suggested uses for alkyl cyanoacrylate compositions include their use in topical application onto intact skin in order to form a polymer layer which inhibits blister and pressure ulcer formation as described in U.S. Pat. No. 5,306,490 and U.S. Pat. No. 5,403,591. Still other suggested uses includes inhibiting irritation arising from prosthetic devices as described in U.S. patent application Ser. No. 08/200,953 as well as inhibiting skin irritation and infection due to incontinence as described in concurrently filed U.S. patent application Ser. No. 08/299,935, entitled "USE OF CYANOACRYLATE ADHESIVES FOR PROVIDING A PROTECTIVE BARRIER FILM FOR THE SKIN". The disclosures of such patent and patent applications being incorporated herein by reference in their entirety. When so employed, the cyanoacrylate adhesive composition is applied topically onto intact skin and, after curing, a cyanoacrylate polymer coating is formed which coating adheres strongly to the skin.

Other uses of alkyl cyanoacrylates include their use with small wounds as described in U.S. Pat. No. 5,417,352 where the cyanoacrylate composition is applied onto the surface of a topical wound (one which does not penetrate, the dermal layer) where, after curing, a protective coating or layer is formed over the wound. The disclosure of this application is also incorporated herein by reference in its entirety.

Ideally, for topical applications as recited above, the alkyl cyanoacrylate compositions should meet as many of the following criteria as possible:

(1) the alkyl cyanoacrylate composition should be formulated to be stable against premature polymerization. Such formulations would therefore be suitable for storage in applicators for multiple use applications and in spray applicators where unintended polymerization can clog the spray mechanism;

(2) the alkyl cyanoacrylate composition should be of suitable viscosity for desired application onto the skin;

(3) once applied to the skin, the alkyl cyanoacrylate should not polymerize so quickly as to generate sufficient heat as to impart a "burning" sensation to the patient but should cure within from about 10 seconds to about 1 minute after application;

(4) the resulting cured polymer should possess sufficient flexibility such that the integrity of the polymer coating is not compromised by, for example, cracking, etc;

(5) the resulting cured polymer should possess sufficient durability such that the polymer does not prematurely shed from the patient's skin; and (6) is non-toxic when applied to skin.

In contrast to topical applications, it is also known that alkyl cyanoacrylate compositions can be employed in surgical environments as suture replacements or hemostats. When employed in these environments, the parameters of the alkyl cyanoacrylate composition for such applications often diverge from the compositional parameters for topical application. For example, unlike topical application over large areas of skin, surgical application of the alkyl cyanoacrylate composition is typically over very specific, small total surface area internal parts of the human body and, accordingly, parameters such as viscosity, curing time, flexibility, durability, etc., are often different for this application as opposed to the parameters required for topical application. Accordingly, while it is recognized in the Robertson, et al., U.S. Pat. No. 3,722,599 to combine a polymerization inhibitor, a thickener, and a plasticizer with a fluoroalkyl cyanoacrylate, these compositions are disclosed for use as suture replacements or as hemostats and such compositions are not always suitable for topical application onto the skin surface.

SUMMARY OF THE INVENTION

This invention is directed to novel alkyl cyanoacrylate compositions suitable for topical application to human skin. The compositions of this invention are characterized by the use of both a specific polymerization inhibitor and amount of this inhibitor which effectively inhibits both premature and too rapid polymerization of the cyanoacrylate adhesive component of the composition and by the use of a critical amount of a plasticizer so as to maintain the integrity of the polymer over the skin surface. In a preferred embodiment, the composition further comprises a suitable amount of a thickening agent to provide for a compositional viscosity suitable for certain applications onto human skin.

Specifically, in a first composition aspect, this invention is directed to an alkyl cyanoacrylate composition which comprises (a) from about 75 to 82 weight percent of an alkyl cyanoacrylate;

(b) from about 50 to 500 parts per million of $SO_2$ as a polymerization inhibitor; and (c) from about 18 percent to about 25 percent by weight of a biocompatible plasticizer wherein the alkyl cyanoacrylate, in monomeric form, is represented by formula I:

$$CH_2=C(CN)-COR \qquad I$$

where R is alkyl of 4 to 10 carbon atoms.

In a second composition aspect, this invention is directed to an alkyl cyanoacrylate composition which comprises (a) from about 75 to 80 weight percent of n-butyl cyanoacrylate;

(b) about 200 parts per million of $SO_2$ as a polymerization inhibitor; and

3

(c) from about 20 percent to about 25 percent by weight of a dialkyl phthalate independently having from 1 to 10 carbon atoms in each alkyl group wherein the n-butyl cyanoacrylate, in monomeric form, is represented by formula I:

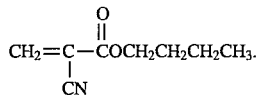

$$CH_2=\underset{CN}{\overset{}{C}}-\overset{O}{\overset{\|}{C}}OCH_2CH_2CH_2CH_3. \qquad I$$

In the compositions of this invention, an amount of a biocompatible plasticizer of from about 18 to about 25 weight percent is essential to provide for a polymer coating (film formation) having the requisite degree of flexibility for the resulting polymer coating such that the coating does not crack upon movement of the skin area to which it was applied while also maintaining suitable durability in the polymer coating and an adequate curing time of from about 10 to 60 seconds. In a preferred embodiment, the biocompatible plasticizer is employed from about 20 to 25 weight percent based on the total weight of the alkyl cyanoacrylate composition.

Likewise, it has been found that the use of from 50 to 500 ppm of $SO_2$ as the polymerization inhibitor is essential in providing for an alkyl cyanoacrylate composition having a curing time which is neither too fast (i.e., less than about 10 seconds) so as to cause a "burning" sensation when applied to the skin nor too slow (greater than 60 seconds) as to interfere with effective application. Additionally, as opposed to other polymerization inhibitors such as methane sulfonic acid, sulfur dioxide is biocompatible with topical application onto human skin and does not produce discernible skin irritation when employed in the amounts recited herein.

In a preferred embodiment, the alkyl cyanoacrylate composition of this invention further comprises a sufficient amount of a thickening agent to provide for a viscosity of from about 2 to 50,000 centipoise at 20° C. The thickening agent employed is any biocompatible material which increases the viscosity of the alkyl cyanoacrylate composition and includes, by way of example, a partial polymer of the alkyl cyanoacrylate, polymethyl methacrylate (PMMA) or other preformed polymers soluble in the alkyl cyanoacrylate, a suspending agent such as fumed silica, and the like with PPMA being preferred.

DETAILED DESCRIPTION OF THE PREFERRED EMBODIMENTS

This invention relates to specific alkyl cyanoacrylate compositions that are particularly well suited for topical application to human skin.

As used herein, the following terms have the following meanings:

The term "cyanoacrylate" refers to an adhesive compound or mixture of compounds based on cyanoacrylate monomers of formula I:

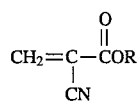

$$CH_2=\underset{CN}{\overset{}{C}}-\overset{O}{\overset{\|}{C}}OR \qquad I$$

where R is selected from the group consisting of alkyl of 4 to 10 carbon atoms. Partial polymers (i.e., oligomers) of such cyanoacrylates are also encompassed within this definition.

4

Preferred R alkyl group are from 4 to 8 carbon atoms and include, by way of example, n-butyl, iso-butyl, sec-butyl, n-pentyl, iso-pentyl, n-hexyl, iso-hexyl, 2-ethylhexyl, n-heptyl, and octyl. More preferably, R is butyl or octyl and most preferably, R is n-butyl.

These cyanoacrylates are known in the art and are described in, for example, U.S. Pat. Nos. 3,527,224; 3,591,676; 3,667,472; 3,995,641; 4,035,334; and 4,650,826 the disclosures of each are incorporated herein by reference in their entirety.

Preferred cyanoacrylates for use in this invention are n-butyl-2-cyanoacrylate and octyl-2-cyanoacrylate.

The term "biocompatible plasticizer" refers to any material which is soluble or dispersible in alkyl cyanoacrylate, which increases the flexibility of the resulting polymer coating on the skin surface, and which is compatible with the skin as measured by the lack of skin irritation. Suitable plasticizers are well known in the art and include those disclosed in U.S. Pat. Nos. 2,784,127 and 4,444,933 the disclosures of both of which are incorporated herein by reference in their entirety. Specific stabilizers include, by way of example only, acetyl tri-n-butyl citrate, butyl benzyl phthalate, dibutyl phthalate, diethyl phthalate, dimethyl phthalate, dioctylphthalate, n-butyryl tri-n-hexyl citrate, benzoate esters of di- and poly-hydroxy branched aliphatic compounds, tri(p-cresyl) phosphate, and the like. The particular plasticizer employed is not critical provided that it does not produce skin irritation as measured by well known assays such as primary skin-irritation (rabbit) as described in Example 3. Preferred plasticizers for use in this invention are dialkyl phthalates independently having from 1 to 10 carbon atoms in each alkyl group. A particularly preferred plasticizer is dioctylphthalate.

Compositions

As noted above, the compositions of this invention comprise from about 75 to 82 weight percent of an alkyl cyanoacrylate having 4 to 10 carbon atoms in the alkyl group, from about 50 to 500 parts per million of $SO_2$ as a polymerization inhibitor, and from about 18 percent to about 25 percent by weight of a biocompatible plasticizer. The compositions are prepared generally by bubbling in the $SO_2$ and mixing the requisite amounts of the liquid plasticizer until a homogeneous mixture is obtained. The mixing procedures are conventional and is typically conducted at room temperature under anhydrous conditions to ensure against water contamination of the composition. At the amounts employed, sulfur dioxide and the biocompatible plasticizer are soluble in the alkyl cyanoacrylate and, accordingly, after mixing a uniform solution is produced which solution can be optionally filtered to remove insolubles.

The resulting composition can optionally contain a sufficient amount of a thickening agent to provide for a viscosity of from about 2 to 50,000 centipoise at 20° C. The thickening agent employed is any biocompatible material which increases the viscosity of the alkyl cyanoacrylate composition and includes, by way of example, a partial polymer of the alkyl cyanoacrylate, polymethyl methacrylate (PMMA) or other preformed polymers soluble in the alkyl cyanoacrylate, a suspending agent such as fumed silica and the like with PMMA being preferred. Thickening agents are deemed to be biocompatible if they are both soluble in the alkyl cyanoacrylate composition and are compatible with the skin as measured by the lack of skin irritation. As before, the lack of skin irritation can be measured by conventional procedures such as primary skin irritation (Rabbit).

The specific viscosity employed for the alkyl cyanoacrylate composition depends, in part, on the intended application of the composition. For example, relatively low viscosities are often preferred where application is to be made to a large surface area. This preference results from the fact that those forms are less viscous and, accordingly, will permit more facile large surface area application of a thin application. Contrarily, where application is to be made to a specific position on the skin, higher viscosity materials are preferred to prevent "running" of the material to unintended locations.

The particular thickening agent employed to enhance the viscosity of the composition is not critical. Preferred thickening agents include polymethyl methacrylate (PMMA), partially polymerized cyanoacrylate adhesives as disclosed in U.S. Pat. Nos. 3,654,239 and 4,038,345 both of which are incorporated herein by reference in their entirety. Another preferred thickening agents for alkyl cyanoacrylate compositions having a viscosity of from about 1500 to 50,000 is fumed silica and the use of this material produces a gel for topical application.

For purposes of this invention, monomeric or partially polymerized n-butyl- 2-cyanoacrylate and/or iso-butyl-2-cyanoacrylate are particularly preferred cyanoacrylate and are capable of effectively bonding to human skin tissue without causing histoxicity or cytotoxicity.

Upon contact with skin moisture and tissue protein, the alkyl cyanoacrylate will polymerize or, in the case of partially polymerized alkyl cyanoacrylate, will further polymerize, at ambient conditions (skin temperature) over about 10 seconds to 60 seconds to provide a solid layer which forms over and strongly adheres to the surface of the skin.

The compositions may additionally contain one or more optional additives such as colorants, perfumes, anti-diffusion agents, rubber extenders, modifying agents, etc. In practice, each of these optional additives should be both miscible and compatible with the cyanoacrylate adhesive. Compatible additives are those that do not prevent the use of the cyanoacrylate adhesives in the manner described herein.

In general, colorants are added so that the polymerized film will contain a discrete and discernable color. Perfumes are added to provide a pleasant smell to the formulation. Rubber extenders are added to further enhance the flexibility of the resulting polymer coating. The amount of each of these optional additives employed in the cyanoacrylate adhesive composition is an amount necessary to achieve the desired effect.

The resulting composition is generally stored in an applicator for use in a single dose application or for use in repeated applications. Single dose applicators include those having breakable or removable seals that prevent moisture, including atmospheric moisture, from contacting the formulation and causing in situ polymerization.

For repeated and intermittent usage, minimal exposure to atmospheric moisture is required. This can be achieved by devices having very narrow outlets and low initial dead space. One applicator for such repeated intermittent use is described in U.S. Pat. No. 4,958,748 which is incorporated herein by reference in its entirety.

Another applicator comprises a conventional spray applicator wherein the cyanoacrylate composition is sprayed onto the surface skin area. The spray rate of the applicator can be controlled so that application of a metered quantity of this composition per unit area of skin surface over a set period of time is controlled.

Still another applicator comprises a brush or solid paddle applicator wherein the alkyl cyanoacrylate composition is "painted" onto the surface skin area containing the superficial wound.

A preferred applicator for repeated and intermittent usage is an applicator suitable for the non-sterile storage and metered dispersement of a alkyl cyanoacrylate composition after opening of the applicator wherein the applicator is characterized as having a resealable opening of no more than about 0.008 square inches (0.0516 square centimeters) so as to permit the metered dispersement of the composition from the applicator and which is capable of multiple administrations of the composition and is further characterized as having resealing means such as a cap which either tightly mates with the applicator or which screws onto the applicator.

Preferably, the opening of the applicator is about 0.0016 to about 0.003 square inches (about 0.0103 to about 0.0194 square centimeters).

In another preferred embodiment, the walls of the applicator are made of a pliable material, so that upon application of pressure onto the walls, the walls depress sufficiently to force the composition contained in the applicator through the opening. Preferably, the applicator is manufactured with its opening covered by a metal foil or other similar construction which closes this opening until the device is ready for use. The opening is then reinstated by use of a pin or similar device which punctures the covering.

In applicators suitable for repeated intermittent uses, the alkyl cyanoacrylate composition is stored at ambient conditions and is selected to be bacteriostatic. See, for example, Rabinowitz et al., U.S. Pat. No. 3,527,224. When the selected composition is bacteriostatic, prolonged storage at ambient conditions is without regard to the sterility of the formulation because there is no adverse buildup of bacteria during storage.

After application, the resulting coating will adhere to the skin for a period of more than 24 hours, and preferably for at least about 2–4 days after which time it sloughs off. Additional applications can be made if desired.

The coating protects the underlying skin because the adhesive forms a polymer coating which extends over the entire surface of the skin. Because the coating is waterproof, the patient is not prevented from bathing and other activities involving exposure to water during the period the adhesive layer covers the skin.

Utility

The compositions of this invention are useful in inhibiting the formation of blisters and the formation of pressure ulcers as described in U.S. Pat. No. 5,306,490 and U.S. patent application Ser. No. 08/082,927. Additionally, the compositions are also useful in inhibiting irritation arising from prosthetic devices as described in U.S. patent application Ser. No. 08/200,953, the disclosures of such patent and patent applications being incorporated herein by reference in its entirety. When so employed, the alkyl cyanoacrylate composition described herein is applied topically onto intact skin and, after curing, a cyanoacrylate polymer coating is formed which coating adheres strongly to the skin. In each case, the resulting coating inhibits formation of blisters, pressure ulcers and irritation arising from the prosthetic device.

Additionally, the alkyl cyanoacrylate compositions described herein can be employed to form a protective coating over small wounds as described in U.S. patent application Ser. No. 08/231,638. When so used, the alkyl cyanoacrylate composition is applied onto the surface of a topical wound and, after curing, a protective coating or layer is formed over the wound.

The following examples illustrates certain embodiments of the invention but is not meant to limit the scope of the claims in any way.

EXAMPLES

Example 1

The purpose of this example is to evaluate the effect of the amount of plasticizer in the alkyl cyanoacrylate composition on the properties of the resulting polymer coating. In this regard, seven alkyl cyanoacrylate compositions were prepared. The formulations comprised n-butyl α-cyanoacrylate in monomeric form, dioctyl phthalate (DOP) as a representative plasticizer ranging from 15% to 50% by weight and 200 ppm $SO_2$. The formulations were packaged in individual bottles.

One drop from each bottle was applied to the skin of a hand. The appearance, curing time, film formation, flexibility and durability of each coating formed were evaluated and the results are shown in Table 1.

In this example, curing times of greater than 1 minute were deemed unacceptable because such curing times would interfere with effective application of the composition onto human skin. Likewise, compositions which failed to polymerize and thereby form a coating on the skin were rated as unsatisfactory. The durability criteria refers to the ability of the composition to be retained on the skin for at least 24 hours and coatings which failed to meet this criteria were deemed unsatisfactory. Lastly, the flexibility criteria refers to the ability of the polymer coating to be retained on the skin without cracking for a period of at least 24 hours and coatings which failed to meet this criteria were also deemed to be unsatisfactory.

TABLE 1

| % DOP | 15 | 20 | 25 | 30 | 35 | 40 | 50 |
| --- | --- | --- | --- | --- | --- | --- | --- |
| Appearance | + | + | + | + | + | + | + |
| Curing Time (1 min.) | + | + | + | +/– | – | – | – |
| Film Formation | + | + | + | +/– | – | – | – |
| Flexibility | – | + | + | + | + | + | + |
| Durability | – | + | + | +/– | – | – | – |

A "+" indicates satisfactory; a "–" indicates unsatisfactory. All of these seven samples appeared clear, water-white and dispensed cleanly in a dropwise fashion. At dioctylphthalate levels of 35 weight percent or more, the n-butyl cyanoacrylate was overwhelmed by the plasticizer and did not form an integral, physical film. Instead, an oily residue resulted. At dioctylphthalate levels of 15 weight percent or less, flexibility and durability suffered. The only coatings providing acceptable results were those employing 20% and 25% plasticizer.

In addition, samples of n-butyl α-cyanoacrylate compositions containing 0% and 10% DOP plasticizer were evaluated and found to form rigid, glass-like coatings, which were uncomfortable, cracked and peeled from the skin.

Example 2

N-butyl cyanoacrylate compositions were prepared which compositions used either 100 ppm methane sulfonic acid or 200 ppm sulfur dioxide as the polymerization inhibitor. Application of these compositions onto human skin indicated that compositions comprising the methane sulfonic acid caused reddening and irritation of the skin within 6 hours whereas the compositions comprising sulfur dioxide did not.

Example 3

The following assays demonstrate that the cyanoacrylate adhesive compositions tested are safe when applied topically.

A. Cytotoxicity Testing by the USP Elution Method

With the use of cell culture techniques, this test determines the lysis (cell death), the inhibition of cell growth, and other toxic effects on cells caused by test materials and/or extracts from the material. For this test, barrier film formed from an alkyl cyanoacrylate composition of Example 1 (20% DOP) was extracted for 72 hours at 50° C. in normal saline. Mouse fibroblast cells were exposed to this extract for 48 hours at 37° C. No reactivity of any kind (a "0" score) was observed.

B. Acute Systemic Toxicity—Current USP

This test estimates the harmful effects of intimate exposure to test materials or extracts in an animal model. Here, the barrier film formed from an alkyl cyanoacrylate composition of Example 1 (20% DOP) was extracted in normal saline and cotton seed oil for 72 hours at 50° C. Five young albino mice were injected I.V. with the saline extract and five mice I.P. with the cotton seed oil extract. The animals were examined at 4, 24, 48, and 72 hours. No reactions, weight loss or deaths were found in any of the test animals.

C. Primary Skin Irritation Test (FHSA) in the Rabbit

This test estimates the irritation potential of test materials using appropriate site tissue, such as skin, in an animal model. Six drops of the alkyl cyanoacrylate composition of Example 1 (20% DOP) were applied to the intact and abraded skin of six healthy albino rabbits and left in place for 24 hours. Test sites were graded for erythema and edema at 24 and 72 hours. The skin irritation index was scored as "0". There was no irritation observed on the skin of any of the rabbits.

D. Delayed Contact Sensization (Repeated Patch Method) in the Guinea Pig

This test estimates the potential for sensitization of a test material using an animal model. Specifically, a film derived of the cyanoacrylate composition of Example 1 (20% DOP) was repeatedly applied to the intact and shaved skin of ten guinea pigs over a three week period, for a total of nine applications. Prior to each product reapplication, the film was removed from the animal by wiping with acetone. After a recovery period of 14 days, the film was again applied to the same animals. Throughout the study, all sites were observed for evidence of dermal reaction. Test results showed a mild or hint skin reaction due to product removal with acetone. There was no evidence of delayed dermal contact sensitization.

From the foregoing description, various modifications and changes in the composition and method will occur to those skilled in the art. All such modifications coming within the scope of the appended claims are intended to be included therein.

What is claimed is:

1. An alkyl cyanoacrylate composition which comprises
   (a) from about 75 to 82 weight percent of an alkyl cyanoacrylate;
   (b) from about 50 to 500 parts per million of $SO_2$, based on the entire weight of the composition, as a polymerization inhibitor; and
   (c) from about 18 percent to about 25 percent by weight of a biocompatible plasticizer which biocompatible plasticizer is a dialkyl phthalate wherein each alkyl group is independently from 1 to 10 carbon atoms wherein the alkyl cyanoacrylate, in monomeric form, is represented by formula I:

$$\underset{\underset{CN}{|}}{CH_2=C}-COR \quad \text{I}$$

where R is alkyl of 4 to 10 carbon atoms.

2. The alkyl cyanoacrylate composition according to claim 1 which comprises from about 150 to about 250 ppm $SO_2$.

3. The alkyl cyanoacrylate composition according to claim 2 which comprises about 200 ppm $SO_2$.

4. The alkyl cyanoacrylate composition according to claim 1 wherein R is alkyl of from 4 to 8 carbon atoms.

5. The alkyl cyanoacrylate composition according to claim 3 wherein R is butyl or octyl.

6. The alkyl cyanoacrylate composition according to claim 4 wherein R is n-butyl.

7. The alkyl cyanoacrylate composition according to claim 1 wherein the dialkyl phthalate is dioctyl phthalate.

8. An alkyl cyanoacrylate composition which comprises
   (a) from about 75 to 80 weight percent of n-butyl cyanoacrylate;
   (b) about 200 parts per million of $SO_2$, based on the entire weight of the composition, as a polymerization inhibitor; and
   (c) from about 20 percent to about 25 percent by weight of a dialkyl phthalate independently having from 1 to 10 carbon atoms in each alkyl group wherein the n-butyl cyanoacrylate, in monomeric form, is represented by formula I:

$$\underset{\underset{CN}{|}}{CH_2=C}-COCH_2CH_2CH_2CH_3. \quad \text{I}$$

9. The alkyl cyanoacrylate composition according to claim 8 wherein said dialkyl phthalate is dioctyl phthalate.

* * * * *